United States Patent
Asai et al.

(10) Patent No.: US 7,813,059 B2
(45) Date of Patent: Oct. 12, 2010

(54) OPTICAL LENS BASE WITH PROTECTIVE FILM AND PROCESS FOR PRODUCING OPTICAL LENS BASE

(75) Inventors: Osamu Asai, Tokyo (JP); Yoshimitsu Gomi, Tokyo (JP); Hatsuyoshi Nakazawa, Tokyo (JP); Manabu Tsurumi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/642,618

(22) Filed: Dec. 18, 2009

(65) Prior Publication Data
US 2010/0097568 A1   Apr. 22, 2010

Related U.S. Application Data

(62) Division of application No. 10/577,592, filed on Apr. 26, 2006, now Pat. No. 7,660,051.

(51) Int. Cl.
*G02B 9/00* (2006.01)
*G02B 11/00* (2006.01)
*G02B 3/00* (2006.01)
*G02C 7/02* (2006.01)

(52) U.S. Cl. ............... 359/796; 359/507; 351/166; 264/1.32

(58) Field of Classification Search ......... 359/796, 359/507; 351/166; 264/1.32, 2.3
See application file for complete search history.

(56) References Cited

U.S. PATENT DOCUMENTS

| | | | | |
|---|---|---|---|---|
| 2,767,612 A | * | 10/1956 | Ondratschek | 359/794 |
| 2,905,054 A | * | 9/1959 | Logan | 359/819 |
| 3,962,833 A | | 6/1976 | Johnson | |
| 5,232,637 A | * | 8/1993 | Dasher et al. | 264/1.32 |
| 5,286,419 A | * | 2/1994 | van Ligten et al. | 264/1.32 |
| 5,526,068 A | * | 6/1996 | Markovitz | 351/44 |
| 6,024,902 A | * | 2/2000 | Maus et al. | 264/40.5 |
| 6,109,748 A | * | 8/2000 | Spector et al. | 351/159 |
| 6,250,512 B1 | * | 6/2001 | Salamon | 222/402.1 |
| 6,801,363 B1 | * | 10/2004 | Bettinger | 359/631 |

(Continued)

FOREIGN PATENT DOCUMENTS

DE   9200513   3/1992

(Continued)

OTHER PUBLICATIONS

"Spectacles" May 22, 1986; Kabushiki Kaisya Medical Aoi Suppan; pp. 83-85.

(Continued)

*Primary Examiner*—Jordan M. Schwartz
(74) *Attorney, Agent, or Firm*—Blakely, Sokoloff, Taylor & Zafman

(57) ABSTRACT

A protective film (10) is eccentrically adhered to a concave-side transfer surface (3b) of a first mold (3) which is used in a plastic lens forming mold, and part (10a) of the peripheral portion of the protective film is projected laterally from the mold (3). The protective film (10) comprises a film layer with an outer diameter smaller than that of the first mold (3), and an adhesive layer with a relatively low adhesive strength which is formed on one surface of the film layer.

6 Claims, 6 Drawing Sheets

U.S. PATENT DOCUMENTS

| | | | |
|---|---|---|---|
| 6,847,492 B2 * | 1/2005 | Wilson et al. | 359/642 |
| 2002/0149862 A1 | 10/2002 | Wallendorf et al. | |
| 2008/0117382 A1 * | 5/2008 | Lacan et al. | 351/166 |

FOREIGN PATENT DOCUMENTS

| | | | |
|---|---|---|---|
| JP | 51120490 | | 10/1976 |
| JP | 52-057592 | A | 5/1977 |
| JP | 55-121028 | A | 9/1980 |
| JP | 55121028 | | 9/1980 |
| JP | 2-1867 | | 1/1990 |
| JP | 02-001867 | A | 1/1990 |
| JP | 06-024852 | U | 4/1994 |
| JP | 06-024853 | | 4/1994 |
| JP | 06-347611 | A | 12/1994 |
| JP | 07-156052 | A | 6/1995 |
| JP | 09-225798 | A | 9/1997 |
| JP | 2001-232542 | A | 8/2001 |
| JP | 2001232542 | A * | 8/2001 |
| JP | 2003-053646 | A | 2/2003 |

OTHER PUBLICATIONS

"Spectacles", May 22, 1985, pp. 83-85, Kabushiki Kaisya Medical Aoi Shuppan.

* cited by examiner

OPTICAL LENS BASE WITH PROTECTIVE FILM AND PROCESS FOR PRODUCING OPTICAL LENS BASE

CROSS-REFERENCE TO RELATED APPLICATION

The present patent application is a Divisional of non-provisional application Ser. No. 10/577,592, filed Apr. 26, 2006 now U.S. Pat. No. 7,660,051, claiming the benefit of Application No. PCT/JP2004/014346, filed Sep. 30, 2004.

TECHNICAL FIELD

The present invention relates to an optical lens base with a protective film and a process for producing an optical lens base.

BACKGROUND ART

An optical lens such as a spectacle lens manufactured in a factory is wrapped in a comparatively soft material called an inner sheet so the optical surface (lens surface) will not be damaged, put in a lens bag, and shipped.

An optical lens base during the manufacture is kept or conveyed as it is stored in an exclusive tray or washing rack. In this case, usually, the surface of the optical lens base is protected with a protective film so the surface of the optical lens base will not be damaged or dust will not attach to it (Japanese Patent Laid-Open No. 6-347611).

When the optical lens base is to be formed to have a predetermined outer shape by edging or the lens surface is to be polished, if the optical lens base is blocked directly, the lens surface may be damaged. For this reason, usually, the optical lens base is blocked through a protective film (Japanese Patent Laid-Open Nos. 2003-053646 and 7-156052, Japanese Utility Model Laid-Open No. 6-024852, and Japanese Patent Laid-Open No. 9-225798).

The term "optical lens base" in the present invention is employed as a generic term that refers to the following products as a whole:

(1) a spectacle optical lens (a glass lens, plastic lens, or semifinished lens) and its intermediate product;

(2) an optical lens (a lens or an optical filter) in a camera, telescope, microscope, or the like, and its intermediate product; and (3) a lens mold for a lens forming mold In the lenses with a protective material described in Japanese Patent Laid-Open No. 6-347611, a transparent strippable sheet is brought into tight contact with each lens surface of an optical lens. As the sheet, a commercially available antistatic sheet, e.g., one called a strippable sheet manufactured by SIMON, COBURN, Hitachi Gousei Kagaku or the like, Raffrezu (Tradename) manufactured by Tonen Sekiyu Kagaku, or Hibron film (Tradename) manufactured by Mitsui Toatsu Sekiyu Kagaku is used by cutting into an appropriate size.

The lens holder described in Japanese Patent Laid-Open No. 2003-053646 serves, when forming an unprocessed circular lens into a pin face lens by edging and beveling, to hold the convex-side lens surface of the lens through a thin double-adhesion elastic seal.

According to the optical lens base polishing method described in Japanese Patent Laid-Open No. 7-156052, the convex-side lens surface of an optical lens base is held by a mounting pan for polishing through a protective film layer and a low-melting metal, and the concave-side lens surface of the optical lens base is polished by the polishing pan. The protective film layer has water solubility and adhesion properties with respect to a low-melting alloy, so it can be removed by washing with water.

The lens holder described in each of Japanese Utility Model Laid-Open No. 6-024852 and Japanese Patent Laid-Open No. 9-225798 is used when edging and beveling a spectacle lens. In the same manner as the lens holder described in Japanese Patent Laid-Open No. 2003-053646, this lens holder forms a cylinder and has a concave spherical lens holding surface at its distal end face. The convex-side lens surface of an unprocessed circular lens is held through a thin double-adhesion elastic seal adhered on the holding surface.

A lens forming mold used in molding an optical lens, e.g., a plastic lens forming mold, comprises a pair of lens molds (to be also referred to as molds hereinafter) made of glass, and a cylindrical gasket ("Spectacles" Published by Medical Aoi Shuppan, May 22, 1985, pp. 83 to 85, and Japanese Patent Publication No. 58-45940). The pair of molds are fitted in the gasket such that their transfer surfaces oppose each other. The space surrounded by the gasket and the pair of molds forms a cavity. A monomer is injected into the cavity and heated for polymerization in an electric furnace to form a plastic lens. Usually, the pair of molds are kept as they are stored in an exclusive washing rack with their transfer surfaces being protected with protective films.

In this manner, when manufacturing an optical lens such as a spectacle lens, to obtain a nondefective lens surface, in the respective manufacturing steps, a protective film is adhered to the lens surface of an optical lens or its intermediate product, or to the transfer surface of a mold so as to protect the lens surface or transfer surface. Thus, the lens surface or transfer surface will not be damaged, or a foreign substance will not attach to it. The optical lens or its intermediate product, or the mold is damaged mainly as it directly comes into contact when storing it in the washing rack or extracting it from the rack, or may also be damaged indirectly by a foreign substance or the like attaching to its surface. Attaching of the foreign substance poses an issue because the foreign substance is difficult to discriminate in appearance from a damage in an inspecting step. Hence, the optical lens, its intermediate product, or the mold is stored in the washing rack as it is protected by the protective film, and conveyed and kept. The protective film is removed when the optical lens, its intermediate product, or the mold is extracted from the washing rack and processed or used. The optical lens, its intermediate product, or the mold is washed after the protective film is removed, to get rid of the foreign substance or contamination attaching to its surface.

DISCLOSURE OF INVENTION

Problem to be Solved by the Invention

In the prior art described above, as shown in Japanese Patent Laid-Open No. 6-347611 as well, since the protective film is adhered to the entire lens surface of the optical lens base, the operation of stripping the protective film is cumbersome. In particular, as the protective film of this type has a comparatively large adhesive strength (tackiness), it is difficult to strip, so the stripping operation takes time all the more.

When the protective film excellent in water solubility described in Japanese Patent Laid-Open No. 7-156052 is used, since a plurality of protective films can be removed at once by water washing, the operator need not strip the protective films one by one from the respective optical lens bases. However, as the protective film requires water solubility, the material of the protective film itself is restricted.

The present invention has been made to solve the conventional problems described above, and has as its object to provide an optical lens base with a protective film and a process for producing an optical lens base, with which a lens surface or transfer surface is prevented from being damaged or a foreign substance is prevented from attaching to it, and the operation of stripping the protective film can be performed readily within a short period of time.

Means of Solution to the Problem

In order to achieve the above object, according to the present invention, there is provided an optical lens base including a convex-side surface to which a protective film for the optical lens base is strippably adhered, wherein the protective film comprises a film layer with an outer diameter smaller than that of the optical lens base, and an adhesive layer with a relatively low adhesive strength which is formed on one surface of the film layer, a central portion of the protective film is adhered to a center of the convex-side surface of the optical lens base, and a peripheral portion of the protective film is spaced apart from the convex-side surface of the optical lens base.

EFFECT OF THE INVENTION

According to the present invention, as the convex-side surface of the optical lens base is protected by the protective film, when the optical lens base is to be conveyed or processed, or to be stored in or extracted from a washing rack, damaging to the convex-side surface can be reliably prevented, and dust can be reliably prevented from attaching to the convex-side surface. Since the peripheral portion of the protective film is not adhered to the optical lens base, the adhesive strength of the protective film can be decreased, so the protective film can be stripped readily.

BEST MODE FOR CARRYING OUT THE INVENTION

Figure 1:
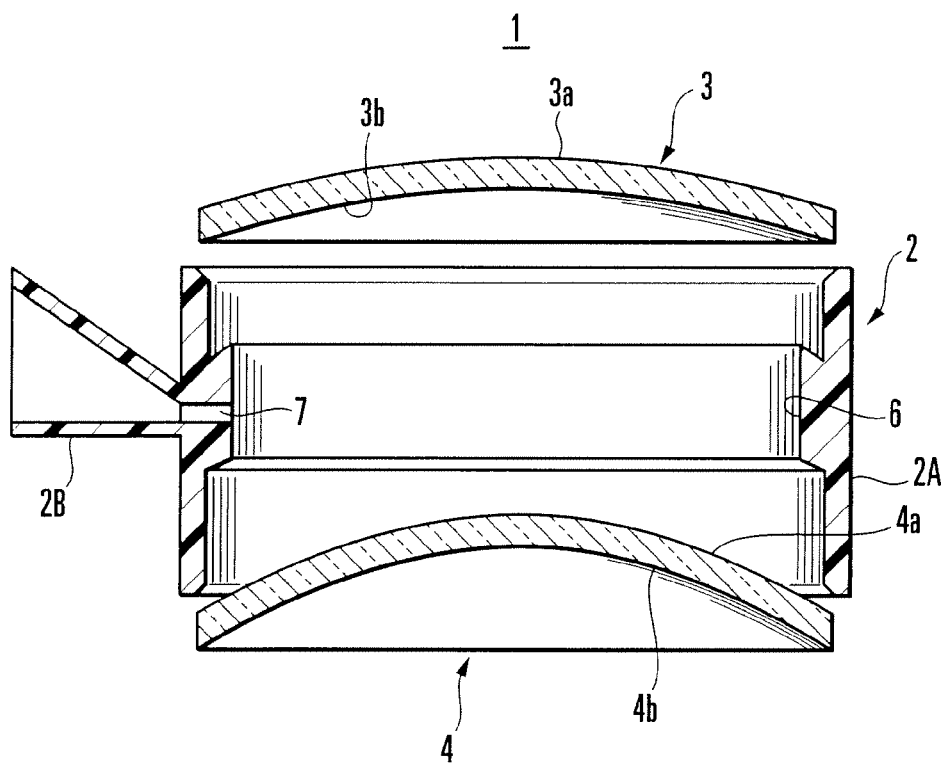
FIG. 1 is a sectional view before assembly of a plastic lens forming mold.

The present invention will be described in detail with reference to the embodiment shown in the drawings.

Figure 2:
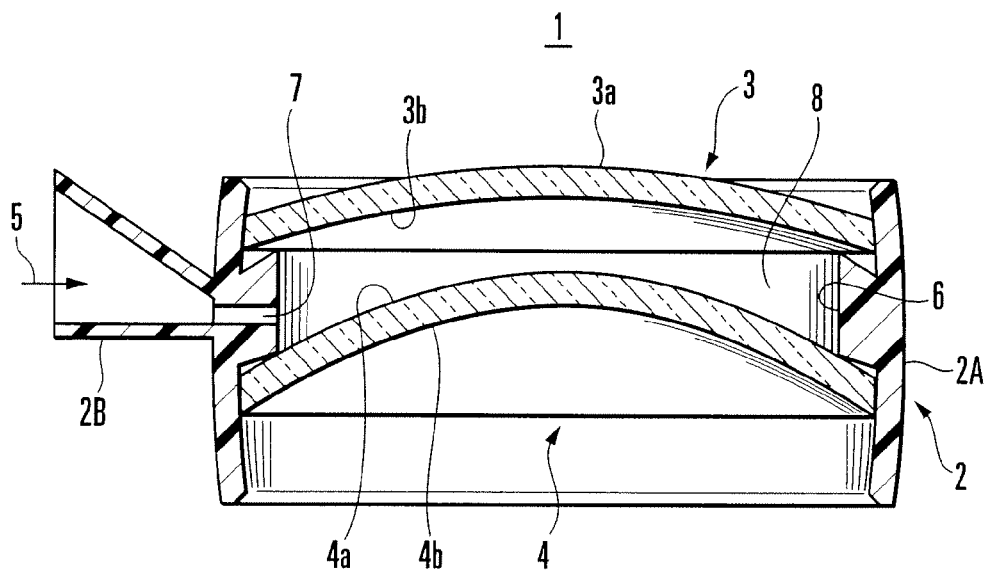
FIG. 2 is a sectional view after assembly of the mold of FIG. 1.

This embodiment is an application to the manufacture of a spectacle plastic lens which is manufactured by casting polymerization. Referring to FIGS. 1 and 2, a plastic lens forming mold (to be merely referred to as a mold hereinafter) 1 for use in casting polymerization comprises a gasket 2 and a pair of lens molds (to be referred to as molds or first and second molds hereinafter) 3 and 4 which are to be fitted in the gasket 2.

The gasket 2 comprises a cylindrical portion 2A which is formed of a synthetic resin into a cylinder having two open ends, and an injecting port portion 2B which integrally projects at the central portion in the direction of height of the outer surface of the cylindrical portion 2A. A ring-like projecting band 6 integrally projects at the central portion in the direction of height of the inner surface of the cylindrical portion 2A along the entire circumference. The injecting port portion 2B is a portion through which a monomer 5 is injected into the gasket 2 when molding a plastic lens. For this purpose, the interior of the cylindrical portion 2A and the interior of the injecting port portion 2B communicate with each other through an injecting hole 7. The injecting hole 7 is formed to extend through the projecting band 6.

The first and second molds 3 and 4 are respectively formed of glass members having the same outer diameter into menisci. The first mold 3 is a mold to form the convex-side lens surface of a plastic lens to be molded, and its two surfaces form a moderately curved convex surface 3a and transfer surface 3b. The convex surface 3a is a surface that is not used as a lens molding surface, and accordingly forms an arbitrary finished surface. The concave surface 3b forms a transfer surface for the convex-side lens surface of the plastic lens to be molded. Thus, the concave surface 3b is planished into a predetermined curved surface.

The second mold 4 is a mold to form the concave-side lens surface of the plastic lens to be molded, and its two surfaces similarly form a moderately curved convex surface 4a and concave surface 4b. The convex surface 4a forms a transfer surface for the concave-side lens surface of the plastic lens to be molded, and is accordingly planished into a predetermined curved surface. The concave surface 4b is a surface that is not used as a lens molding surface, and accordingly forms an arbitrary finished surface.

When the first and second molds 3 and 4 are forced into the gasket 2 by predetermined amounts, as shown in FIG. 2, the plastic lens forming mold 1 is assembled. In this case, the first mold 3 is positioned as it is urged against the upper surface of the projecting portion 6 with a predetermined pressure, and accordingly its forcing amount into the gasket 2 is substantially constant regardless of the type (dioptric power) of the lens to be molded. In contrast to this, the second mold 4 is forced by a forcing amount that matches the type of the lens to be molded, so it opposes the first mold 3 at a predetermined gap. When the first and second molds 3 and 4 are incorporated in the gasket 2, a space 8 surrounded by the first and second molds 3 and 4 and projecting band 6 is formed in the gasket 2. The space 8 forms a cavity to form the plastic lens, and communicates with the outside of the gasket 2 through the injecting hole 7 and injecting port portion 2B.

Because the transfer surface 3b of the first mold 3 and the transfer surface 4a of the second mold 4 transfer the optical surface shapes and surface states of the plastic lens to be fabricated, their damages, if any, are directly transferred onto the lens surfaces of the plastic lens to be manufactured to produce a defective product. Therefore, the first and second molds 3 and 4 must be handled sufficiently carefully. For this purpose, when the first and second molds 3 and 4 are not in use, protective films 10 are adhered to their transfer surfaces 3b and 4a to protect them. Then, the first and second molds 3 and 4 are stored and kept in an exclusive washing rack 20 shown in FIGS. 5A and 5B.

Figure 4:
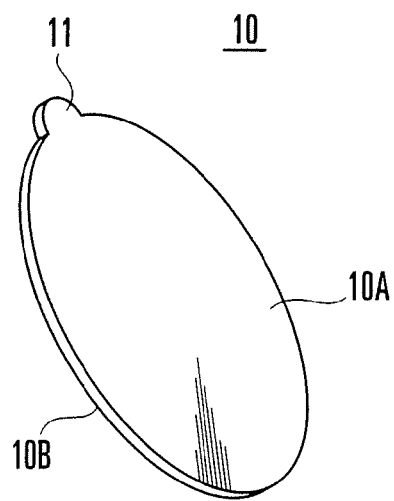
FIG. 4 is a perspective view of a protective film.

As shown in FIG. 4, the protective film 10 comprises a base portion (to be referred to as a film layer hereinafter) 10A which is formed of polyethylene and an ethylene-acetate vinyl copolymer, or low-density polyethylene into a circular shape (with a diameter of, e.g., 65 mm) smaller than the outer diameter of each of the first and second molds 3 and 4, and an adhesive layer 10B which is formed on the lower surface of the film layer 10A and has an EVA-based pressure sensitive adhesive. A projection 11 integrally projects on part of the outer surface of the protective film 10. The film layer 10A is colored with an appropriate color such as green, blue, or red that can be visually recognized readily. The film layer 10A has a thickness of 50 μm to 100 μm. The projection 11 has a size of about a width of 5 mm×a length of 10 mm.

The film layer 10A of the protective film 10 is colored to improve the visibility of the protective film 10. Even when the film layer 10A is transparent, the present invention can be practiced. When, however, appearance inspection, dioptric power test, painting, marking, or the like of the lens is to be performed, the film layer must be stripped even if it is a transparent protective film. Therefore, it is desirable to use a protective film formed by coloring the film layer 10A to improve the visibility.

The adhesive strength of the adhesive layer 10B is lower than that of a commercially available conventional one, and is, e.g., about 4 g/mm² to 15 g/25 mm² (the measurement conditions of the adhesive strength include a stripping rate of 300 mm/min and a stripping angle of 180° in the case of an acrylic resistant board). The preferable tensile strength (vertical), tensile strength (horizontal), Young's modulus (vertical), Young's modulus (horizontal), tensile impact strength (vertical), tensile strength (vertical), coefficient of static friction, and haze value of the adhesive layer 10B are 150 kg/cm², 145 kg/cm², 1,000 kg/cm², 1,100 kg/cm², 11 kg×cm per 10 lenses, 11 kg×cm per 10 lenses, 2 tan θ, and about 11%, respectively.

Figure 3A:
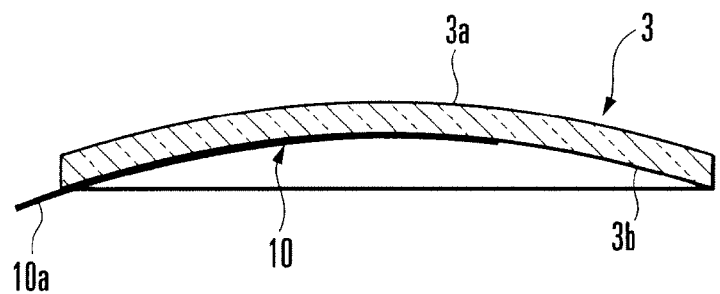
FIGS. 3A and 3B are views showing states wherein protective films are adhered to the transfer surfaces of the first and second molds, respectively.
Figure 3B:
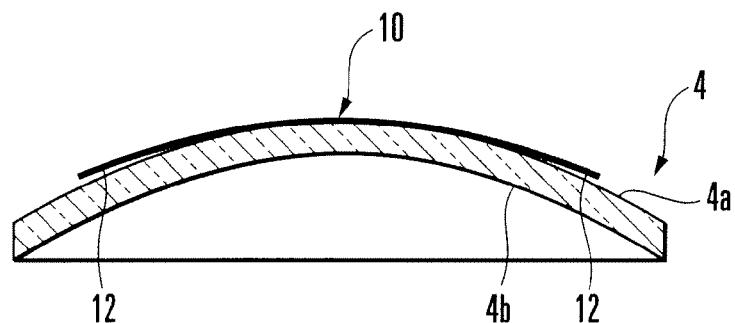

Assume that such protective films 10 are to be adhered to the concave-side transfer surface 3b and convex-side transfer surface 4a of the first and second molds 3 and 4, respectively. The protective film 10 is adhered to the first mold 3 to be eccentric with respect to the concave-side transfer surface 3b, as shown in FIG. 3A, and that portion 10a of the peripheral portion of the protective film 10 where the projection 11 projects is projected laterally from the first mold 3. As for the second mold 4, the protective film 10 is adhered to it such that its center substantially coincides with the center of the convex-side transfer surface 4a, as shown in FIG. 3B. In this case, if the protective film 10 is curved along the convex-side transfer surface 4a of the second mold 4, although the central portion of the protective film 10 can be adhered in tight contact with the convex-side transfer surface 4a, its peripheral portion waves to form wrinkles and thus cannot be adhered in tight contact with the convex-side transfer surface 4a, and a gap 12 forms between the peripheral portion and the convex-side transfer surface 4a. The size of the gap 12 changes depending on the curvature of the convex-side transfer surface 4a, the material and thickness of the film layer 10A, and the like. In the case of the first mold 3, as the transfer surface 3b is a concave surface, the wrinkles generated in the peripheral portion are considerably fewer than in the transfer surface 4a formed of the convex surface. Thus, substantially the entire surface (excluding the projecting portion 10a) of the protective film 10 can be brought into contact with the concave-side transfer surface 3b. Therefore, a gap hardly forms between the concave-side transfer surface 3b and the protective film 10.

Figure 5A:
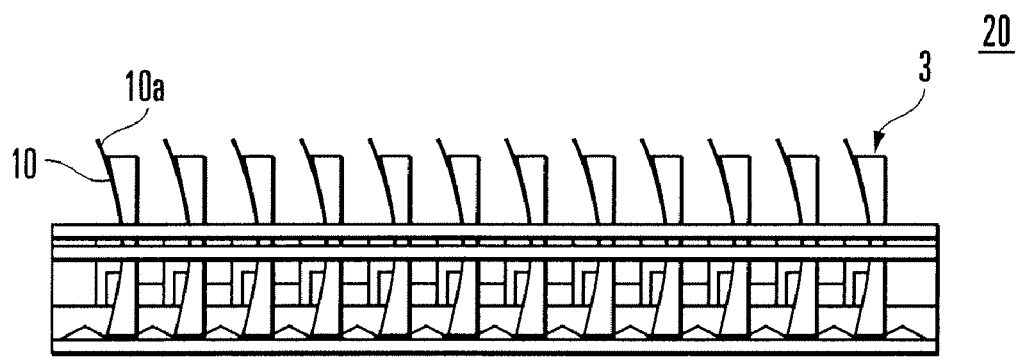
FIGS. 5A and 5B are front and plan views, respectively, of a washing rack.
Figure 5B:
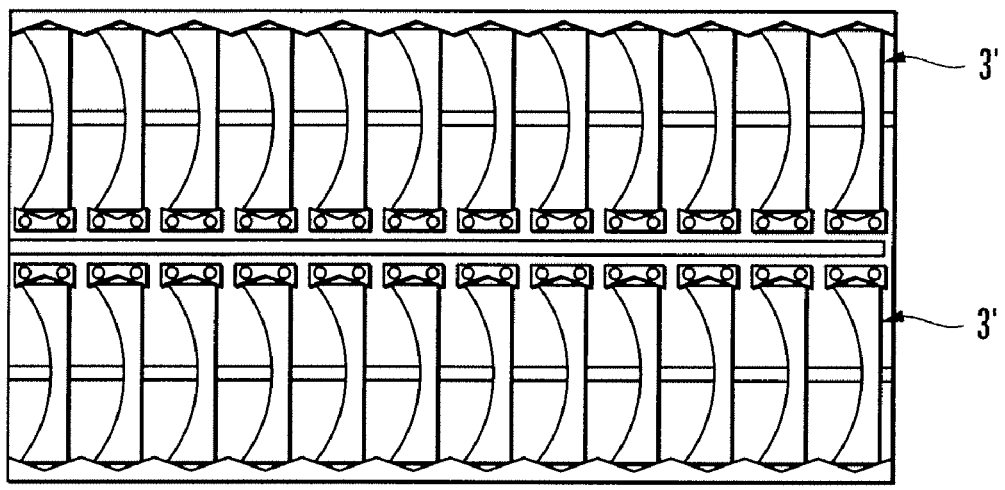

Referring to FIGS. 5A and 5B, the washing rack 20 has such a size that a total of 24 molds can be vertically stored in it in two rows. FIG. 5A shows an example in which 24 first molds 3 are stored, and FIG. 5B shows a state in which two different types of molds with transfer surfaces having different radii of curvature, i.e., 12 molds 3 and 12 molds 3' are stored.

The gaps in front of and behind and on the left and right of the space of the washing rack 20 where the respective molds 3 and 3' are stored are set comparatively narrow due to the reasons of the size of the washing machine, washing efficiency, the efficient use of the accommodation space, and the like. Hence, the molds 3 and 3' must be unloaded and loaded sufficiently carefully so the concave-side transfer surfaces of the molds 3 and 3' will not come into contact with the washing rack 20 and be damaged by it. When storing the molds 3 and 3' in the washing rack 20, they are stored such that the portions 10a (FIG. 3A) of the protective films 10 projecting from the concave-side transfer surfaces 3b of the molds 3 and 3' face up. Similarly, when storing the second mold 4 shown in FIG. 3B, preferably, it is preferably stored such that the projection 11 of the protective film 10 faces up.

A plastic lens manufacturing process with the mold 1 will be briefly described with reference to FIGS. 6 to 10.

Figure 6:
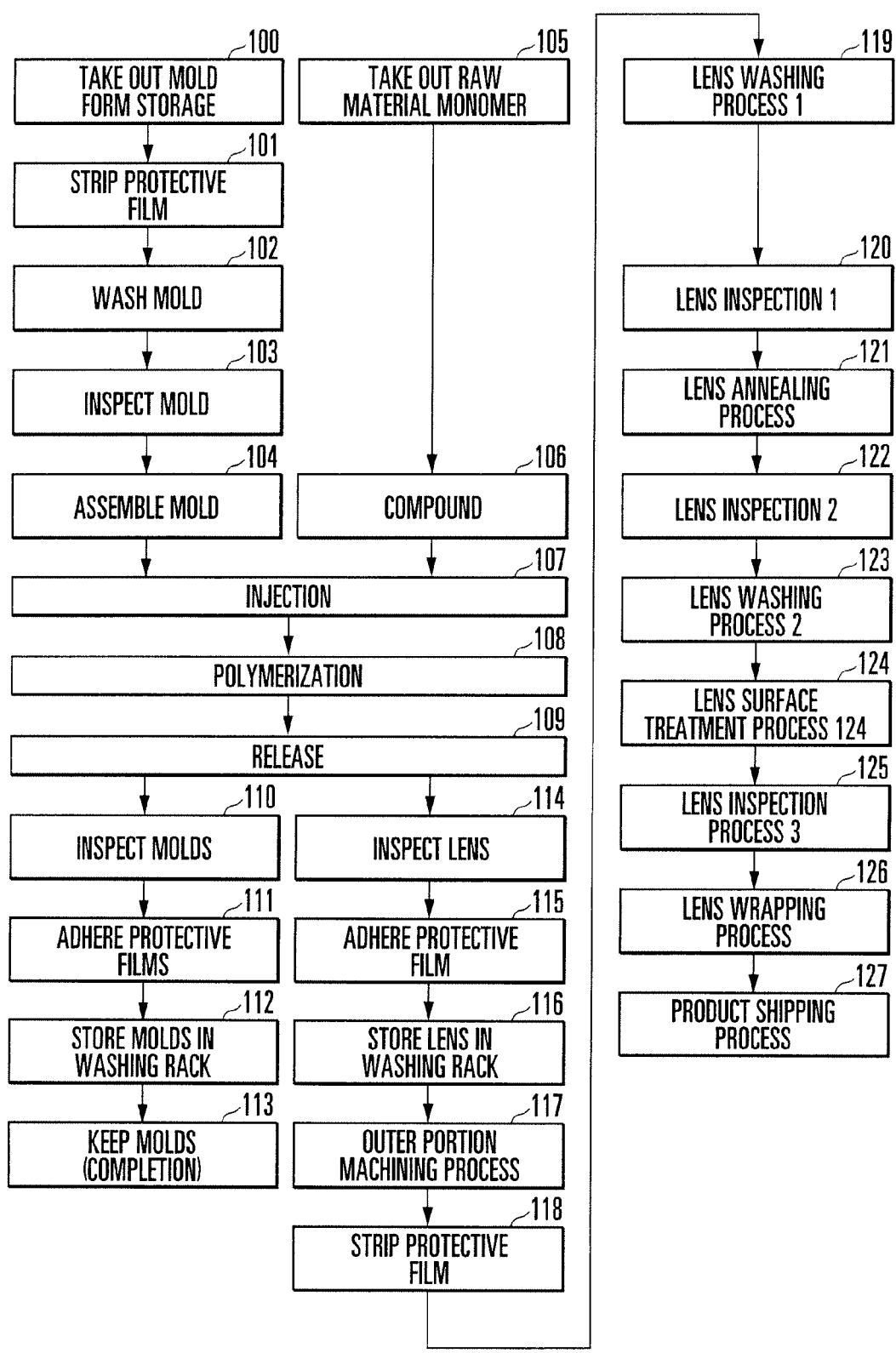
FIG. 6 is a flowchart showing the steps in manufacturing a plastic lens according to the present invention.

First, in step 100 of FIG. 6, the first and second molds 3 and 4 shown in FIGS. 1 and 2 are taken out from a storage, and the protective films 10 (FIGS. 3A and 3B) respectively adhered to their concave-side transfer surface 3b and convex-side transfer surface 4a are stripped (step 101). Then, these molds 3 and 4 are washed (step 102).

The protective films 10 are stripped by air blowing. In stripping, air is blown from above to the molds 3 and 3' stored in the washing rack 20 (FIGS. 5A and 5B) to blow off the protective films 10. At this time, as the projecting portion 10a of the protective film 10 adhered to the first mold 3 projects upward, when air is blown to the projecting portion 10a from the convex-side transfer surface 3b side of the protective film 10, the protective film 10 can be easily removed from the first mold 3.

The protective film 10 adhered to the second mold 4 can be easily removed by similarly blowing air to the gap 12 (FIG. 3B) between the convex-side transfer surface 4a and the outer peripheral portion (10a), where the projection 11 projects, of the protective film 10. The protective film 10 stripped from the mold 3 drops to a portion below the washing rack 20 and is recovered. The pneumatic pressure of air blowing is about 0.4 MPa. The protective film 10 can be removed with washing liquid (water) in place of air blowing. In this case, the cleaning liquid may be blown from a nozzle to the gap 12 between the convex-side transfer surface 4a and protective film 10 in the same manner.

Subsequently, whether or not damages are formed or foreign substances attach to the concave-side transfer surface 3b and convex-side transfer surface 4a of the washed molds 3 and 4 is inspected (step 103). When the molds 3 and 4 pass, they are fitted in the gasket 2 to assemble the mold 1 shown in FIG. 2 (step 104).

Along with the assembly of the mold 1, a raw material monomer is taken out of the storage (step 105). A catalyst is added to the raw material monomer with a predetermined proportion, and the mixture is stirred well and compounded (step 106). The stirred and compounded monomer 5 is filtered by a filter and injected into the mold 1 (step 107).

Examples of the plastic lens raw material monomer can include various types of monomers that are employed as plastic lens raw materials. For example, monomeric raw materials such as an acrylic resin, a diethylene glycol bisallyl carbonate polymer, a dimetacrylate polymer of bisphenol A (halide) and its copolymer, a urethane denatured (meta) acrylate polymer of bisphenol A (halide), and a urethane polymer and its copolymer are used.

Naturally, a mixture consisting of two or more types of the above monomers can be used to mold a copolymer lens. A catalyst and an ultraviolet absorbing agent when necessary, and furthermore a releasing agent, a bluing agent, an antioxidant, and the like can be added to the plastic lens raw material monomer. The catalyst is appropriately selected in accordance with the type of the monomer. Various types of ultraviolet absorbing agents can be used in accordance with the optical characteristics, weathering resistance, and the like required for the plastic lens.

After the monomer 5 is injected into the cavity 8 of the mold 1, the mold 1 is placed in an electric furnace and heated to a predetermined temperature to polymerize the monomer 5 (step 108). The heating conditions are appropriately adjusted in accordance with the type and composition (when the monomer is a mixture) of the monomer 5, the type of the catalyst, and the like. If polymerization is insufficient, it causes deterioration over time and variations in color during dyeing. Thus, polymerization is performed with a sufficient time (e.g., about 12 to 48 hours). When the raw material monomer 5 becomes a copolymer, depending on its type, it may shrink to be smaller in volume than the monomer 5. Therefore, polymerization must be performed considering this shrink. When the raw material monomer 5 completely polymerizes and cools down, the mold 1 is released, and a polymerized lens 30 (see FIGS. 7A and 7B) with a lens shape is extracted from the mold 1 (step 109). The polymerized lens 30 is an intermediate product of the plastic lens.

After the molding, the concave-side transfer surface 3b and convex-side transfer surface 4a of the employed first and second molds 3 and 4 are inspected with transmitted light and reflected light, respectively (step 110). If no abnormality is found by the inspection, new protective films 10 are adhered to the concave-side transfer surface 3b and convex-side transfer surface 4a of the first and second molds 3 and 4, respectively (step 111), and the molds 3 and 4 are stored in the exclusive washing rack 20 (step 112). The washing rack 20 is then kept in the storage to prepare for the next use (step 113). The protective films 10 are adhered to the molds 3 and 4 and the molds 3 and 4 are stored in the washing rack 20 in the above manner.

Figure 7A:
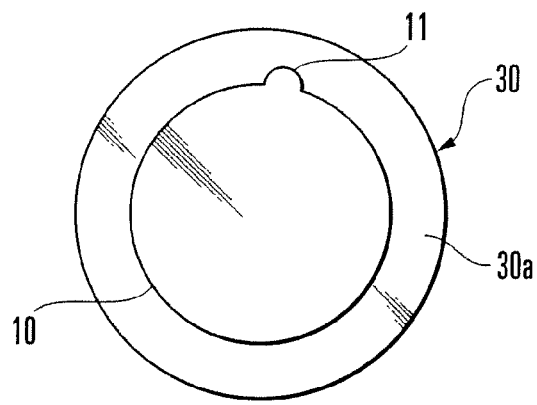
FIGS. 7A and 7B are front and side views, respectively, of a polymerized lens.
Figure 7B:
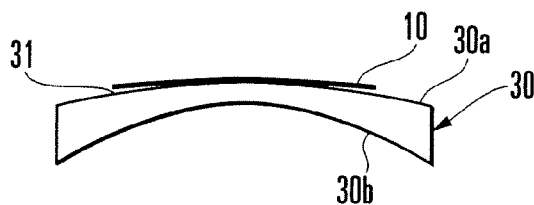

Lens tailings generated in release attach to the lens surfaces of the released polymerized lens 30. Thus, after the release, air is blown to the lens surfaces to remove the lens tailings. Furthermore, whether or not any damages are formed on a convex-side lens surface 30a and concave-side lens surface 30b of the polymerized lens 30 is inspected by irradiation with transmitted light and reflected light (step 114). If no damages are observed, a protective film 10 is adhered to the center of the convex-side lens surface 30a of the polymerized lens 30, as shown in FIGS. 7A and 7B, so the lens surface 30a will not be damaged, or no foreign substance (step 115) will attach to it, and the polymerized lens 30 is stored in an exclusive lens washing rack (not shown) (step 116). The exclusive lens washing rack is formed to be substantially identical to the exclusive mold washing rack 20 shown in FIGS. 5A and 5B. Accordingly, in unloading and loading the polymerized lens 30 from and in the exclusive lens washing rack, sufficient care must be paid so the convex-side lens surface 30a will not be abutted against the washing rack and damaged by it.

The protective film 10 is adhered to only the convex-side lens surface 30a of the polymerized lens 30 because the convex-side lens surface 30a has been finished with a predetermined accuracy and will not be subjected to post-machining in the same manner as a semifinished lens (a lens only the convex surface of which is optically finished). As the concave-side lens surface 30b will be polished in post-machining to have a predetermined accuracy, at this point, no protective film 10 need be adhered to it. The protective film 10 is adhered to the convex-side lens surface 30a such that substantially its center coincides with the center of the convex-side lens surface 30a, in the same manner as in adhesion to the convex-side transfer surface 4a of the second mold 4. Hence, the peripheral portion of the protective film 10 is spaced apart from the convex-side lens surface 30a, and a gap 31 forms between them.

Figure 8A:
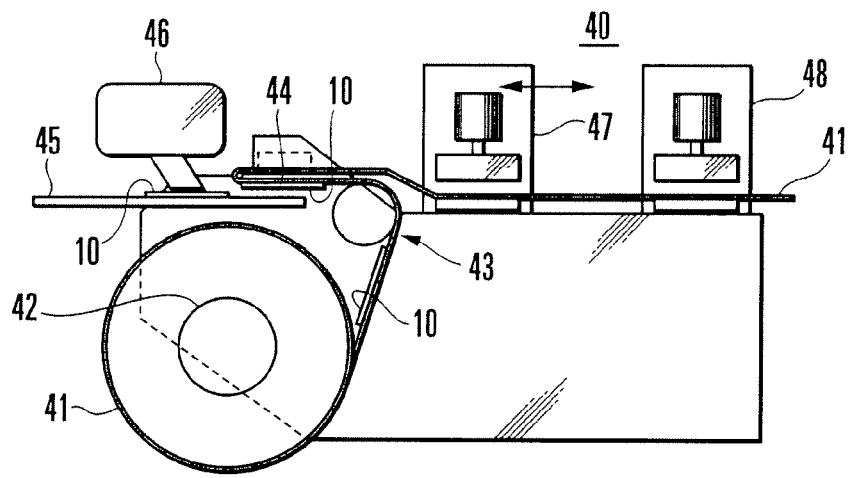
FIGS. 8A and 8B are front and plan views, respectively, of a film adhering device.
Figure 8B:
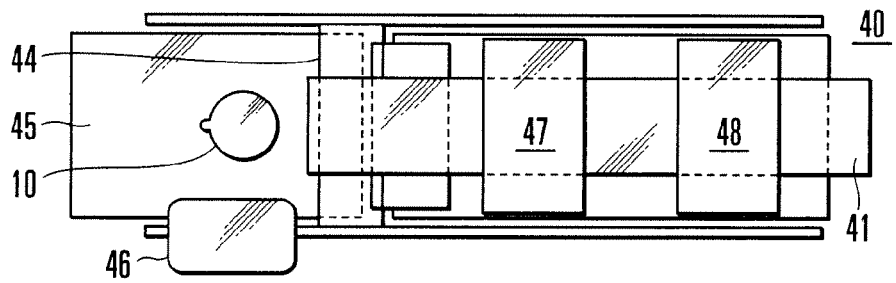

The protective films 10 are adhered to the molds 3 and 4 and polymerized lens 30 automatically by a film adhering device 40 shown in FIGS. 8A and 8B. The film adhering device 40 comprises a take-up mechanism 43 in which roll-type mount paper 41 adhered with the protective films 10 is fed from a supply reel 42 and taken up by a take-up reel (not shown), a stripping blade 44, a seal plate 45 made of an elastic material such as rubber, a static eliminator 46, first and second cylinders 47 and 48, and the like.

Figure 9:
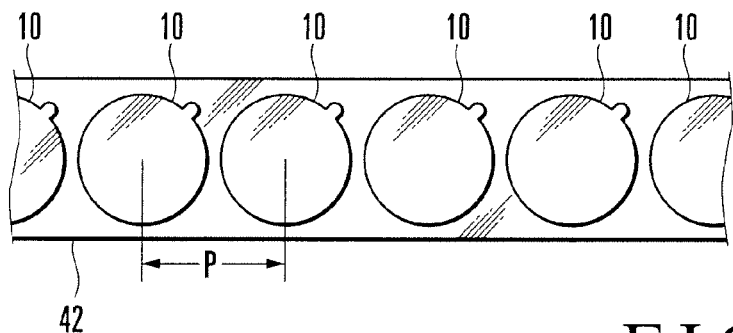
FIG. 9 is a view showing a mount paper on which protective films are adhered.

A predetermined number of (e.g., 800) protective films 10 are adhered to the mount paper 41 in a row at predetermined intervals, as shown in FIG. 9. The mount paper 41 has a width of 75 mm, the protective films 10 have outer diameters of 65 mm, and an array pitch P of the protective films 10 is 70 mm.

When the distal end portion of the mount paper 41 wound around the supply reel 42 is pulled out and guided to the distal end portion of the lower surface of the stripping blade 44, the mount paper 41 is folded back by 180° toward the upper surface of the stropping blade 44 and guided to under the first and second cylinders 47 and 48, and its distal end is fixed to the take-up reel. When the protective films 10 are to be automatically adhered by the film adhering device 40, the mount paper 41 is intermittently fed out from the supply reel 42 by the take-up mechanism 43 and taken up by the take-up reel.

The stripping blade 44 reverses the mount paper 41 by 180° to separate each protective film 10 from the mount paper 41. The protective film 10 separated from the mount paper 41 falls onto the seal plate 45 with the adhesive layer 10B facing up, and is adhered as it is urged from above by the convex-side lens surface 30a of the polymerized lens 30.

The first cylinder 47 is a movable cylinder that reciprocates in the convey direction of the protective film 10. When the first cylinder 47 moves forward, it moves toward the second cylinder 48 while holding the mount paper 41. When the first cylinder 47 moves backward, it releases the mount paper 41 and is restored to the home position shown in FIG. 8A. The second cylinder 48 is a stationary cylinder that is fixed to the stationary portion of the film adhering device 40. When the first cylinder 47 moves backward, the second cylinder 48 operates to hold the mount paper 41. This aims at retaining the mount paper 41 so as not to be pulled back by the restoring movement of the first cylinder 47.

When stripping the protective film 10 from the mount paper 41, static electricity, although a little, is generated in the protective film 10. The static eliminator 46 blows ions to the protective film 10 stripped from the mount paper 41 so as to remove the static electricity generated in the protective film 10. Therefore, the protective film 10 need not be subjected to any special antistatic treatment. The static eliminator 46 is a commercially available product. For example, a ±bipolar DC corona discharge type, TAIBS ion balance control type static eliminator having a destaticizing distance of 50 mm to 500 mm and a destaticizing area of 400 mm×400 mm is used.

Referring to FIG. 6 again, the polymerized lens 30 is adhered with the protective film 10 in step 115, stored in the exclusive lens washing rack in step 116, and sent to the next outer portion machining process (edging process) together with the washing rack. In the etching process, the polymerized lens 30 is subjected to outer portion machining by an edging device 55 shown in FIG. 10 (step 117).

After the polymerized lens 30 is released, the inner surface of the gasket 2 is transferred to the outer surface of the polymerized lens 30, so the shape of the outer surface of the polymerized lens 30 may be nonuniform, or the outer diameter of the polymerized lens 30 may not be constant due to damages formed in the release. In order to reshape the outer portion so as to form the outer diameter accurately, the outer portion of the polymerized lens 30 released in the edging step is cut (several mm) by cutting so the polymerized lens 30 is finished to have a predetermined outer diameter.

Figure 10:
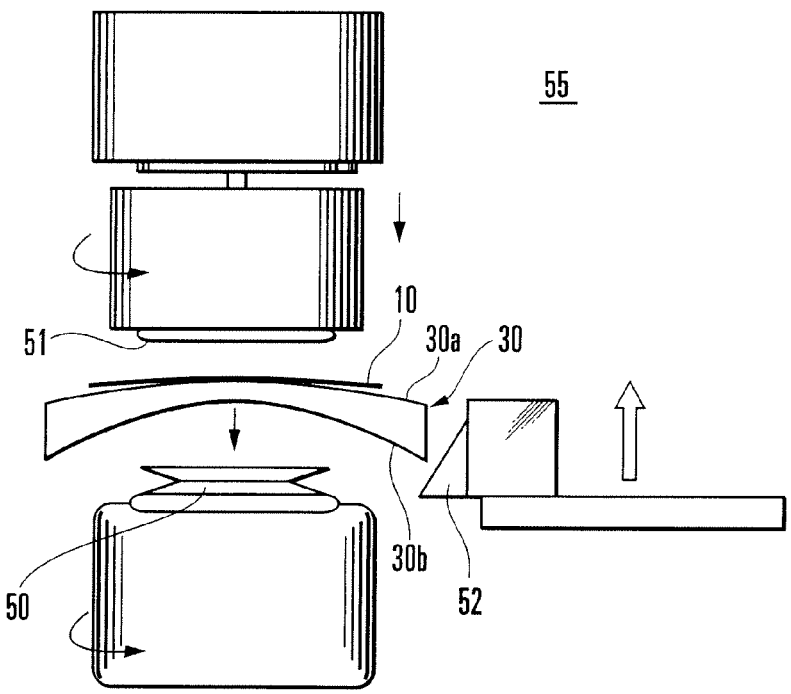
FIG. 10 is a view showing a lens edging device.

When performing edging by the edging device 55, the polymerized lens 30 must be held by an appropriate means. Since the outer portion of the lens is to be cut, however, it is impossible to hold the end face (edge surface) of the lens outer portion which is a non-optical surface. Therefore, the optical surfaces of the convex-side lens surface 30a and concave-side lens surface 30b are held by a holding means, although this is not the optimum. More specifically, as shown in FIG. 10, the concave-side lens surface 30b is vacuum-chucked by a chucking board 50, and an O-ring 51 is urged against the convex-side lens surface 30a, thus holding the optical surfaces of the lens surfaces 30a and 30b.

Edging comprises cutting the outer portion of the polymerized lens 30 by a cutting blade 52 while rotating the held polymerized lens 30 at high speed. When a cutting load acts on the outer portion of the polymerized lens 30, the reaction at the central portion of the lens may be amplified by "leverage". Thus, a sufficient lens holding force must be maintained.

When holding the central portion of the convex-side lens surface 30a, if a foreign substance exists between the O-ring 51 and convex-side lens surface 30a, it may damage the convex-side lens surface 30a. Therefore, according to the present invention, the protective film 10 is adhered to the convex-side lens surface 30a in advance, and the O-ring 51 is urged against the convex-side lens surface 30a through the protective film 10, thereby preventing damage. As the concave-side lens surface 30b is polished in the post-processing, the protective film 10 need not always be adhered to it.

When edging is ended, the polymerized lens 30 is unloaded from the edging device 55 and stored in the exclusive washing rack. The adhered protective film 10 is removed from the polymerized lens 30 by air blowing or washing water blowing (step 118). Subsequently, the polymerized lens 30 in the washing rack is washed by the washing machine (first washing) to remove cutting tailings or the like attaching to the surface of the polymerized lens 30 (step 119).

The washing machine used in this embodiment has 12 washing layers, or a washing space called a washing bath. The polymerized lens 30 stored in the washing rack is dipped in the washing liquid in the first layer, and then sequentially sent through to the last layer so as to be washed. If the size of the washing rack is increased, the sizes of the respective washing layers must also be increased, thus considerably increasing the size of the washing machine itself. By considering the space to install the washing machine, the washing machine and washing rack can be designed to have necessary minimal sizes. To further increase the size of the washing rack is not preferable, partly because the physical load to the operator in conveyance to the storage or the following processes increases.

In the washing process (step 119) of the polymerized lens 30, it is not preferable to wash the polymerized lens 30 with the protective film 10 being adhered to it. This is due to the following reason. When the polymerized lens 30 with the protective film 10 being attached to it is washed by the washing machine, if part of the adhesive layer 10B is stripped from the film layer 10A and attaches to the polymerized lens 30 again, the polymerized lens 30 cannot be washed. If the stripped film layer 10A or adhesive layer 10B clog the drain, the water cannot be drained, which adversely affects the function itself of the washing machine. The washing machine forcibly removes the foreign substance attaching to the lens surface with ultrasonic waves. The protective film 10 blocks the ultrasonic waves, and a sufficient washing effect on the lens surface cannot be obtained. Therefore, when washing the polymerized lens 30 by the washing machine, the protective film 10 is removed by air blowing in advance, and thereafter the polymerized lens 30 is washed. Such a washing machine is also used for washing the molds 3 and 4.

When the first lens washing process in step 119 is ended, the first lens inspection is performed (step 120). The first lens inspection in step 120 is an appearance inspection performed to inspect an abnormality such as damages or the like on the optical lens surface. The lens surface is irradiated with white light, and inspected with the reflected light of the irradiated light.

After that, the surface of the polymerized lens 30 is smoothed by annealing to remove optical distortion (step 121). Annealing is performed by heating the polymerized lens 30 at about 100° C. for about 1 to 2 hours. For annealing, the polymerized lens 30 is transferred from the washing rack to a refractory exclusive tray. The polymerized lens 30 is then stored in an electric furnace together with the exclusive tray, and is annealed.

When annealing is ended, the second lens inspection (step 122) is performed. In the second lens inspection, the polymerized lens 30 is set between a zircon lamp and screen to form a lens projection image by transmitted light. An internal defect of the polymerized lens 30 is inspected from the projection image. When inspection is ended, the protective film 10 is adhered to the convex surface 30a of the polymerized lens 30, and the polymerized lens 30 is stored in the exclusive washing rack again. After the polymerized lens 30 is stored in the washing rack, only the protective film 10 is removed from it by air blowing, and after the second washing process (step 123), the surface treatment (dyeing, step 124) of the polymerized lens 30 is performed. When dyeing is completed, the third lens inspection (last inspection, step 125) is performed. An accepted article is subjected to layout mark painting and marking, wrapped (step 126), and shipped from the factory as a product (step 127). The manufacturing processes according to the present invention are different from the conventional manufacturing processes in that the protective film stripping processes of steps 101, 115, and 118 are added to them.

This embodiment has been exemplified by an example wherein the protective films 10 are adhered to the molds 3 and 4 of the plastic lens forming mold 1 as an optical lens base and to the polymerized lens 30 fabricated by the mold 1. However, the present invention is not limited by this example at all, and can directly be applied to a glass lens.

The number of the projections 11 of the protective film 10 is not limited to one. If a plurality of (e.g., four) projections 11 are provided, the optical lens base can be stored in the washing rack without considering much the direction of the protective film 10. Then, the protective film 10 can be stripped by air blowing or washing liquid blowing more readily.

Figure 11:
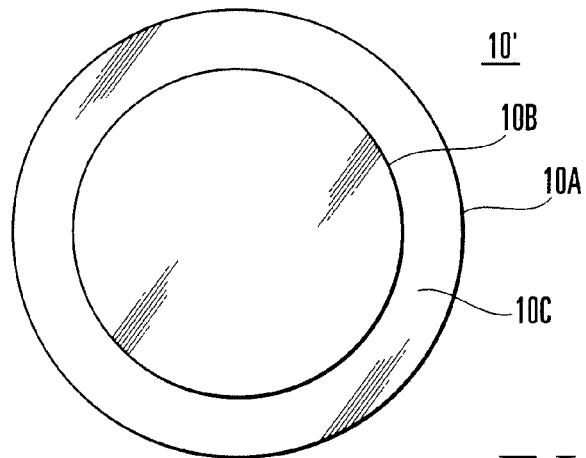
FIG. 11 is a plan view showing another embodiment of the present invention.

The embodiment described above shows the protective film 10 in which the adhesive layer 10H is applied to the entire lower surface of the film layer 10A. However, the present invention is not limited to this at all. As shown in FIG. 11, a protective film 10' can be used in which an adhesive layer 10B is applied to only the central portion of the lower surface of a film layer 10A and the peripheral portion of the lower surface of the film layer 10A forms a non-adhesive layer portion 10C to which the adhesive layer 10B is not applied. In this case, even if the adhesive layer has the same adhesive strength, the adhesive strength can be decreased more than in a case wherein the adhesive layer 10B is applied to the entire lower surface. Thus, the protective film 10' can be stripped more readily than in the case wherein air or washing liquid is blown to the entire lower surface. Therefore, in this case, the projection 11 need not always be provided to the protective film 10.

The protective film 10 is not limited to a circular one, but can have an arbitrary shape such as an ellipse or star shape.

In adhering the protective film 10 by the film adhering device 40, in the best mode described above, it is adhered to only the convex surface 30a of the polymerized lens 30. Another protective film 10 can also be adhered to the concave surface 30b when necessary. When two protective films 10 are adhered to the two surfaces 30a and 30b, in stripping the protective films 10 by air blowing or washing liquid blowing, the direction of the air gun or nozzle may be changed to sequentially remove the protective films 10 on the convex surface 30a side and concave surface 30b side. When storing the mold 3 in the washing rack 20, it is stored in the washing rack 20 with the projection 11 of the protective film 10 facing up. However, the projection 11 need not always face up as far as it allows air blowing or washing liquid blowing.

INDUSTRIAL APPLICABILITY

The present invention is applied to the manufacture of a plastic lens particularly with the plastic lens forming mold 1. However, the present invention is not limited to this at all, but can be suitably applied to the manufacture of a plastic lens or glass lens by polishing, the manufacture of a lens mold by polishing, and the manufacture of a lens mold by softening. The present invention can also be applied to the manufacture of other lenses that require a washing rack, e.g., a camera lens.

The invention claimed is:

1. An optical lens base comprising a lens mold including a concave-side transfer surface to which a protective film for said optical lens base is strippably adhered, characterized in that said protective film comprises a film layer with an outer diameter smaller than that of said lens mold, and an adhesive layer with an adhesive strength that allows stripping of said protective film from said optical lens base which is formed on one surface of said film layer, and said protective film is eccentrically adhered to said concave-side transfer surface of said lens mold, so part of a peripheral portion of said protective film projects laterally from said lens mold.

2. An optical lens base with a protective film according to claim 1, characterized in that said film layer of said protective film has been colored.

3. An optical lens base with a protective film according to claim 1, characterized in that a projection integrally extends on part of a periphery of said protective film, and said lens mold is stored in a washing rack such that said projection faces up.

4. An optical lens base with a protective film according to claim 1, characterized in that a thickness of said film layer of said protective film is 50 .mu.m to 100 .mu.m, and an adhesive strength of said adhesive layer is 4 g/25 mm.sup.2 to 15 g/25 mm.sup.2.

5. A process for producing an optical lens base with a protective film, characterized by comprising the steps of molding the optical lens base with a concave-side surface by a lens mold, separating the optical lens base from the lens mold, eccentrically adhering the protective film for the optical lens base, including a film layer with an outer diameter smaller than that of the optical lens base and an adhesive layer with an adhesive strength that allows stripping of said protective film from said optical lens base which is formed on one surface of the film layer, on the concave-side surface of the optical lens base such that part of a peripheral portion of the protective film projects laterally from the optical lens base, mounting the optical lens base, to which the protective film has been adhered, in a processing device and cutting an outer surface of the optical lens base, storing the optical lens base in a washing rack such that a projecting portion of the protective film which projects from the optical lens base faces up, removing the protective film from the optical lens base by blowing a fluid, and washing the optical lens base.

6. A process for producing an optical lens base with a protective film according to claim 5, characterized in that the fluid to be blown to the optical lens base comprises either one of air and washing water.

* * * * *

UNITED STATES PATENT AND TRADEMARK OFFICE
CERTIFICATE OF CORRECTION

PATENT NO. : 7,813,059 B2  Page 1 of 1
APPLICATION NO. : 12/642618
DATED : October 12, 2010
INVENTOR(S) : Osamu Asai et al.

It is certified that error appears in the above-identified patent and that said Letters Patent is hereby corrected as shown below:

On the Title Page, in Item [30], under Foreign Application Priority Data, please insert
-- Nov. 10, 2003  (JP)  2004-380155 --.

Signed and Sealed this
Twenty-sixth Day of July, 2011

David J. Kappos
*Director of the United States Patent and Trademark Office*